(12) United States Patent
Suzuki et al.

(10) Patent No.: US 12,469,873 B2
(45) Date of Patent: Nov. 11, 2025

(54) SOLID ELECTROLYTE-CONTAINING LAYER

(71) Applicant: SUMITOMO CHEMICAL COMPANY, LIMITED, Tokyo (JP)

(72) Inventors: Junji Suzuki, Osaka (JP); Chikara Murakami, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 569 days.

(21) Appl. No.: 17/796,147

(22) PCT Filed: Jan. 27, 2021

(86) PCT No.: PCT/JP2021/002776
§ 371 (c)(1),
(2) Date: Jul. 28, 2022

(87) PCT Pub. No.: WO2021/153593
PCT Pub. Date: Aug. 5, 2021

(65) Prior Publication Data
US 2023/0145927 A1    May 11, 2023

(30) Foreign Application Priority Data
Jan. 31, 2020  (JP) ................. 2020-015453

(51) Int. Cl.
*H01M 10/00* (2006.01)
*H01M 10/056* (2010.01)

(52) U.S. Cl.
CPC .. *H01M 10/056* (2013.01); *H01M 2300/0068* (2013.01); *H01M 2300/0082* (2013.01); *H01M 2300/0091* (2013.01)

(58) Field of Classification Search
CPC ................ H01M 4/00; H01M 10/00
See application file for complete search history.

(56) References Cited

U.S. PATENT DOCUMENTS

| 2018/0277891 A1 | 9/2018 | Mimura et al. |
| 2019/0088994 A1 | 3/2019 | Makino et al. |

(Continued)

FOREIGN PATENT DOCUMENTS

| CN | 109155162 A |   | 1/2019 |   |
| CN | 110581311 A | * | 12/2019 | ........ H01M 10/0525 |

(Continued)

OTHER PUBLICATIONS

Cao et al. A Composite Solid Electrolyte Film And Its Preparation Method, Solid-state Battery, Dec. 2019, See the Abstract. (Year: 2019).*

(Continued)

*Primary Examiner* — Tiffany Legette
*Assistant Examiner* — Monique M Wills
(74) *Attorney, Agent, or Firm* — Rimon P.C.

(57) ABSTRACT

Provided is a solid electrolyte-containing layer capable of preventing a short circuit caused by the formation of a dendrite. A solid electrolyte-containing layers (30) in accordance with an aspect of the present invention includes (i) an inorganic solid electrolyte (31), (ii) a heat-resistant resin (32), and (iii) at least one selected from the group consisting of an ionic liquid, a mixture of an ionic liquid and a lithium salt, and a polymer electrolyte.

5 Claims, 2 Drawing Sheets

(56) References Cited

U.S. PATENT DOCUMENTS

| | | |
|---|---|---|
| 2019/0356017 A1 | 11/2019 | Osada et al. |
| 2019/0386322 A1 | 12/2019 | Yawata et al. |
| 2021/0091409 A1 | 3/2021 | Mimura et al. |
| 2021/0376379 A1 | 12/2021 | Osada et al. |

FOREIGN PATENT DOCUMENTS

| | | |
|---|---|---|
| EP | 3 389 129 A1 | 10/2018 |
| JP | 2004-152659 A | 5/2004 |
| JP | 2009-218005 A | 9/2009 |
| JP | 2017-014493 A | 1/2017 |
| JP | 2019-102301 A | 6/2019 |
| JP | 2019-199394 A | 11/2019 |
| JP | 2020-205243 A | 12/2020 |
| WO | 2017/099248 A1 | 6/2017 |
| WO | 2017/199821 A1 | 11/2017 |
| WO | 2018/168505 A1 | 9/2018 |

OTHER PUBLICATIONS

Translation of the Written Opinion of the International Searching Authority issued in International Application No. PCT/JP2021/002776, dated Apr. 27, 2021.
International Search Report issued in corresponding International Application No. PCT/JP2021/002776, dated Apr. 27, 2021, with English translation.
Extended European Search Report received in corresponding EP Application No. 21747717.3, dated Feb. 16, 2024.

* cited by examiner

SOLID ELECTROLYTE-CONTAINING LAYER

CROSS REFERENCE

This application is the U.S. National Phase under 35 U.S.C. § 371 of International Application No. PCT/JP2021/002776, filed on Jan. 27, 2021, which claims the benefit of Japanese Application No. 2020-015453, filed on Jan. 31, 2020, the entire contents of each are hereby incorporated by reference.

TECHNICAL FIELD

The present invention relates to a solid electrolyte-containing layer. The present invention relates also to an all-solid-state secondary battery, a method for producing an all-solid-state secondary battery, and a method for preventing a short circuit in an all-solid-state secondary battery.

BACKGROUND ART

An all-solid-state secondary battery is a secondary battery in which a solid electrolyte is employed as an electrolyte. Solid electrolytes fall roughly into an inorganic solid electrolyte and an organic solid electrolyte. In order for both of the inorganic and organic solid electrolytes to be put into practical use, research and development is proceeding. Patent Literature 1 provides an example of an all-solid-state secondary battery in which an inorganic solid electrolyte is used. Patent Literature 2 provides an example of an all-solid-state secondary battery in which an organic solid electrolyte is used.

CITATION LIST

Patent Literature

[Patent Literature 1]
Japanese Patent Application Publication, Tokukai, No. 2019-199394
[Patent Literature 2]
Japanese Patent Application Publication, Tokukai, No. 2019-102301

SUMMARY OF INVENTION

Technical Problem

The above related art has room for further improvement of prevention of a short circuit between electrodes caused by a dendrite.

An object of an aspect of the present invention is to provide a solid electrolyte-containing layer capable of preventing a short circuit caused by the formation of a dendrite.

Solution to Problem

The inventors of the present invention found that the above object can be attained by using a solid electrolyte-containing layer in which an inorganic solid electrolyte is combined with another material. Specifically, the present invention includes the following configurations.

<1>
A solid electrolyte-containing layer including: an inorganic solid electrolyte; a heat-resistant resin; and at least one selected from the group consisting of an ionic liquid, a mixture of an ionic liquid and a lithium salt, and a polymer electrolyte.

<2>
The solid electrolyte-containing layer described in <1> in which the heat-resistant resin has a glass-transition temperature of not less than 200° C.

<3>
The solid electrolyte-containing layer described in <1> or <2> in which the inorganic solid electrolyte is a sulfide-based solid electrolyte or an oxide-based solid electrolyte.

<4>
An all-solid-state secondary battery including: a positive electrode; the solid electrolyte-containing layer described in any one of <1> to <3>; and a negative electrode.

<5>
A method for producing an all-solid-state secondary battery, the method including the step of disposing, between a positive electrode and a negative electrode, the solid electrolyte-containing layer described in any one of <1> to <3>.

<6>
A method for preventing a short circuit in an all-solid-state secondary battery, the method including disposing, between a positive electrode and a negative electrode, the solid electrolyte-containing layer described in any one of <1> to <3>.

Advantageous Effects of Invention

With an aspect of the present invention, it is possible to provide a solid electrolyte-containing layer capable of preventing a short circuit caused by the formation of a dendrite.

DESCRIPTION OF EMBODIMENTS

The following description will discuss embodiments of the present invention. However, the present invention is not limited thereto.

A numerical expression "A to B" herein means "not less than A and not more than B" unless otherwise noted.

[1. Solid Electrolyte-Containing Layer]

Figure 1:
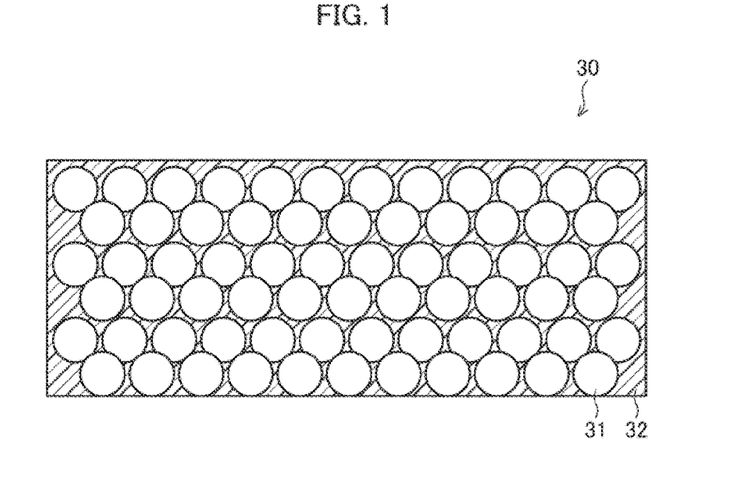
FIG. 1 is a schematic diagram of a configuration of a solid electrolyte-containing layer in accordance with an embodiment of the present invention.

Reference is made to FIG. 1. A solid electrolyte-containing layer 30 includes: (i) an inorganic solid electrolyte 31; (ii) a heat-resistant resin 32; and (iii) at least one selected from the group consisting of an ionic liquid, a mixture of an ionic liquid and a lithium salt, and a polymer electrolyte.

In an all-solid-state secondary battery in which a solid electrolyte is used as an electrolyte, there is a problem of the formation of a dendrite. Specifically, metal (e.g., metallic lithium) is dendritically deposited, typically on a negative electrode side, as a charge-discharge cycle or a constant-voltage charge is performed. This dendritic metal (dendrite) grows from the negative electrode side to a positive electrode side along the grain boundaries of the solid electrolyte. This causes a problem of a short circuit between the positive electrode and the negative electrode. In the present invention, this problem is solved by providing the solid electrolyte-containing layer 30.

A study conducted by the inventors of the present invention has revealed that a layer consisting of an inorganic solid electrolyte (in particular, an oxide-based solid electrolyte) and a heat-resistant resin has low ion conductivity. This is considered to be due to the presence, between the inorganic solid electrolytes, of the heat-resistant resin having low ion conductivity, the presence causing the inorganic solid electrolytes to be isolated without being in contact with each other and thus causing an ion conduction path to be interrupted.

In contrast, the solid electrolyte-containing layer 30 includes not only the inorganic solid electrolyte 31 and the heat-resistant resin 32 but also at least one selected from the group consisting of an ionic liquid, a mixture of an ionic liquid and a lithium salt, and a polymer electrolyte. In the solid electrolyte-containing layer 30, at least one selected from the group consisting of an ionic liquid, a mixture of an ionic liquid and a lithium salt, and a polymer electrolyte is present between particles of the inorganic solid electrolyte 31. This brings about a smooth formation of an ion conduction path. The solid electrolyte-containing layer 30 therefore has more excellent ion conductivity than the layer consisting of an inorganic solid electrolyte and a heat-resistant resin, and is advantageously applied to all-solid-state secondary batteries 100a, 100b, and 100c.

All-solid-state secondary batteries, in which a flammable organic solvent is not used as an electrolytic solution, have a low risk of ignition and combustion and are intrinsically highly safe. For this reason, a cooling system is considered unnecessary for all-solid-state secondary batteries, unlike conventional liquid-based secondary batteries. All-solid-state secondary batteries are therefore intended for use under higher temperature. Another intended case is that all-solid-state secondary batteries are used while being externally warmed by using a heat generator, such as a heater, so that the ion conductivity of the solid electrolyte is increased. In this case, the inside of the all-solid-state secondary battery is affected also by heat generated by charging and discharging and can be in a high-temperature environment (approximately 150° C. or higher). When a resin other than a heat-resistant resin is used as a material of the solid electrolyte-containing layer, the resin softens or melts, or the solid electrolyte-containing layer itself deforms under such a high-temperature environment. This makes it easy for dendrites to penetrate the solid electrolyte-containing layer. That is a new problem found by the inventors of the present invention. The heat-resistant resin 32 is therefore used as a resin to be combined with the inorganic solid electrolyte 31.

The heat-resistant resin 32 has a glass-transition temperature preferably of not less than 200° C. and more preferably of not less than 250° C. When the glass-transition temperature of the heat-resistant resin 32 is not less than 200° C., it is possible to prevent a short circuit between electrodes caused by the formation of a dendrite even when the insides of the all-solid-state secondary batteries 100a, 100b, and 100c are in a high-temperature environment as described above.

[1.1. Inorganic Solid Electrolyte]

The solid electrolyte-containing layer 30 contains the inorganic solid electrolyte 31. Examples of the inorganic solid electrolyte include a sulfide-based solid electrolyte, an oxide-based solid electrolyte, and a nitride-based solid electrolyte. Among these solid electrolytes, a sulfide-based solid electrolyte and an oxide-based solid electrolyte are susceptible to growth of a dendrite along the grain boundaries of electrolyte particles. The solid electrolyte-containing layer 30 makes it possible, even when a sulfide-based solid electrolyte or an oxide-based solid electrolyte is used therein, to reduce dendrites and therefore prevent a short circuit between electrodes caused by the formation of a dendrite. Further, a sulfide-based solid electrolyte has a risk of generating a poisonous gas, such as hydrogen sulfide, when being exposed to the atmosphere, whereas an oxide-based solid electrolyte does not have such a risk. It is therefore preferable to use an oxide-based solid electrolyte as the inorganic solid electrolyte 31 from the viewpoint of the safety of the all-solid-state secondary battery.

The sulfide-based solid electrolyte typically contains the lithium element and the sulfur element. The sulfide-based solid electrolyte preferably further contains one or more elements selected from the group consisting of the phosphorus element, the germanium element, the tin element, and the silicon element. The sulfide-based solid electrolyte may contain one or more elements selected from the group consisting of the oxygen element and halogen elements (e.g., the fluorine element, the chlorine element, the bromine element, the iodine element).

Examples of the sulfide-based solid electrolyte include $Li_2S—P_2S_5$, $Li_2S—P_2S_5—GeS_2$, $Li_2S—P_2S_5—SnS_2$, $Li_2S—P_2S_5—SiS_2$, $Li_2S—P_2S_5—LiI$, $Li_2S—P_2S_5—LiI—LiBr$, $Li_2S—P_2S_5—Li_2O$, $Li_2S—P_2S_5—Li_2O—LiI$, $Li_2S—SiS_2$, $Li_2S—SiS_2—LiI$, $Li_2S—SiS_2—LiBr$, $Li_2S—SiS_2—LiCl$, $Li_2S—SiS_2—B_2S_3—LiI$, $Li_2S—SiS_2—P_2S_5—LiI$, $Li_2S—B_2S_3$, $Li_2S—P_2S_5—Z_mS_n$ (m and n are positive numbers, and Z is Ge, Zn, or Ga), $Li_2S—GeS_2$, $Li_2S—SiS_2—Li_3PO_4$, and $Li_2S—SiS_2—Li_xMO_y$ (x and y are positive numbers, and M is P, Si, Ge, B, Al, Ga, or In). Here, the expression "A-B" means a "material made by using a raw material composition containing A and B". For example, the expression "$Li_2S—P_2S_5$" means a "material made by using a raw material composition containing $Li_2S$ and $P_2S_5$".

Examples of the oxide-based solid electrolyte include: a NASICON-type solid electrolyte (e.g., $LiTi_2(PO_4)_3$ and an element-substitution product thereof ($Li_{1+x}Al_xTi_{2-x}(PO_4)_3$, $Li_{1+x+y}Al_xTi_{2-x}P_{3-y}Si_yO_{12}$, and the like)); a perovskite-type solid electrolyte (e.g., $(LaLi)TiO_3$ and $La_{1-3x}Li_{3x}TiO_3$); a LISICON-type solid electrolyte (e.g., $Li_4SiO_4$ and $LiGeO_4$, and an element-substitution product thereof (for example, $Li_{4-2x}Zn_xGeO_4$ (e.g., $Li_{14}ZnGe_4O_{16}$)); a glass ceramic-type solid electrolyte (e.g., $Li_{1.5}Al_{0.5}Ge_{1.5}(PO_4)_3$); $Li_3N$ and a H-substitution product thereof; and $Li_3PO_4$ and a N-substitution product thereof (e.g., $Li_{2.9}PO_{3.3}N_{0.46}$ (LIPON)).

Examples of the oxide-based solid electrolyte also include a garnet-type solid electrolyte having a garnet-type crystal structure. A garnet-type solid electrolyte has high lithium ion conductivity and is stable with respect to, for example, water, oxygen, and lithium metal.

A garnet-type solid electrolyte can take a cubic crystal structure. Examples of the garnet-type solid electrolyte include a composite oxide containing Li, La, and Zr and a composite oxide containing Li, La, and Ta. The garnet-type solid electrolyte may contain one or more substitution elements selected from the group consisting of Al, Mg, Ca, Sr, Ba, Ta, Nb, and Yb. More specific examples include $Li_7La_3Zr_2O_{12}$ (LLZ), $Li_6La_3Ta_{1.5}Y_{0.5}O_{12}$ (LLTY), and $Li_6BaLa_2Ta_2O_{12}$ (LBLT). Examples of an element-substitution product of LLZ include $Li_{7-3x}Al_xLa_3Zr_2O_{12}$ and $Li_{7-x}La_3Zr_{2-y}M_yO_{12}$ (M is a pentavalent element such as Nb or Ta).

The inorganic solid electrolyte may be glass, may be glass ceramic, or may be a crystal material. Glass is obtained by subjecting a raw material composition (e.g., a mixture of $Li_2S$ and $P_2S_5$) to amorphization treatment. Examples of the amorphization treatment include mechanical milling. Glass ceramic is obtained by subjecting glass to heat treatment. A crystal material is obtained by, for example, subjecting a raw material composition to solid-state reaction treatment.

The inorganic solid electrolyte is in the form of particles. The inorganic solid electrolyte has an average particle diameter ($D_{50}$) whose lower limit is, for example, not less than 0.01 μm. The upper limit of the average particle diameter ($D_{50}$) of the inorganic solid electrolyte is, for example, not more than 10 μm, and is preferably not more than 5 μm. The upper limits and the lower limits of $D_{50}$ may be combined. As a result of the combination, examples of the range of the average particle diameter include not less than 0.01 μm and not more than 10 μm. The inorganic solid electrolyte has an ion conductivity (e.g., lithium ion conductivity) at 25° C. whose lower limit is, for example, not less than $1\times10^{-5}$ S/cm, and is preferably not less than $1\times10^{-4}$ S/cm. The upper limit of the ion conductivity (e.g., lithium ion conductivity) at 25° C. of the inorganic solid electrolyte is, for example, not more than $1\times10^{-2}$ S/cm. The lower limits and the upper limits of the ion conductivity (e.g., lithium ion conductivity) of the inorganic solid electrolyte may be combined. As a result of the combination, examples of the range of the ion conductivity include: not less than $1\times10^{-5}$ S/cm and not more than $1\times10^{-2}$ S/cm; and not less than $1\times10^{-4}$ S/cm and not more than $1\times10^{-2}$ S/cm.

The average particle diameter ($D_{50}$) of the inorganic solid electrolyte is measured by a laser diffraction scattering method. Specifically, the measurement is carried out as follows.
1. In 50 ml of 0.2 mass % aqueous sodium hexametaphosphate solution, 0.1 g of powder of the inorganic solid electrolyte is introduced, so that a dispersion liquid in which the powder is dispersed is obtained.
2. The particle size distribution of the obtained dispersion liquid is measured by using a laser diffraction scattering-type particle size distribution measuring device (e.g., Microtrac MT3300EXII available from MicrotracBEL Corporation), so that a volume-based cumulative particle size distribution curve is obtained.
3. In the obtained cumulative particle size distribution curve, the particle diameter value of the point at which a cumulative volume whose accumulation is started at a particle having the smallest diameter reaches 50% is an average particle diameter ($D_{50}$(μm)).

Examples of a method for measuring the lithium ion conductivity of the inorganic solid electrolyte at 25° C. include a method in which an impedance method is used. Specifically, the measurement is carried out as follows.
1. A measurement sample is subjected to compression, sintering, etc. so that the measurement sample is shaped into a pellet form.
2. A coin-type lithium battery CR2032 (which can be hereinafter referred to as a coin cell) is prepared by sandwiching the measurement sample between two sheets of blocking electrodes (e.g., electrodes made of SUS), in a dry argon atmosphere in a glove box. Vapor deposition of gold may be formed on the measurement sample so that an interfacial resistance between the measurement sample and the blocking electrodes is reduced.
3. The obtained coin cell is conditioned in a thermostatic chamber at 25° C. for 12 hours.
4. Measurement is carried out by using an impedance measuring device at a desired temperature, for frequencies ranging from 0.1 Hz to 1 MHz and an amplitude of 10 mV. An ion electrical conductivity σ is calculated from the following formula:

$$\sigma(S\cdot cm^{-1})=t(cm)\times R(\Omega)/A(cm^2)$$

In this formula, R represents the value of an impedance. A represents the area of a sample, and t represents the thickness of the sample.

[1.2. Heat-Resistant Resin]

The solid electrolyte-containing layer 30 contains a heat-resistant resin. As used herein, the "heat-resistant resin" refers to a resin that does not soften, melt, or pyrolyze under a high-temperature environment. Here, the "high-temperature environment" refers to an environment where the temperature is 150° C. The heat-resistant resin has a glass-transition temperature preferably of not less than 200° C., more preferably of not less than 250° C., and even more preferably of not less than 300° C. Such a resin does not soften, melt, or pyrolyze even when the all-solid-state secondary batteries 100a, 100b, and 100c are used while being warmed without use of a cooling system.

The upper limit of the glass-transition temperature of the heat-resistant resin is not more than 450° C., for example. The upper limits and the lower limits of the glass-transition temperature of the heat-resistant resin may be combined. As a result of the combination, examples of the range of the glass-transition temperature include: not less than 200° C. and not more than 450° C.; not less than 250° C. and not more than 450° C.; and not less than 300° C. and not more than 450° C.

Examples of the heat-resistant resin include polyamide, polyimide, polyamide imide, polycarbonate, polyacetal, polysulfone, polyphenylene sulfide, polyether ether ketone, aromatic polyester, polyether sulfone, polyetherimide, cellulose ethers, polybenzimidazole, polyurethane, and melamine resin. One of these heat-resistant resins may be used alone, or a mixture of two or more of these heat-resistant resins may be used.

Among the heat-resistant resins described above, polyamide, polyimide, polyamide imide, aromatic polyester, polyether sulfone, and polyetherimide are preferable, and polyamide, polyimide, and polyamide imide are more preferable, from the viewpoint of possession of higher heat resistance. Among polyamide, polyimide, and polyamide imide, a nitrogen-containing aromatic polymer is more preferable from the viewpoint of heat resistance. Examples of the nitrogen-containing aromatic polymer include an aromatic polyamide (a para-oriented aromatic polyamide, a meta-oriented aromatic polyamide, etc.), an aromatic polyimide, and an aromatic polyamide imide. Among these nitrogen-containing aromatic polymers, an aromatic polyamide is more preferable and a para-oriented aromatic polyamide is particularly preferable. As used herein, aromatic polyamide can be expressed as "aramid" and para-oriented aromatic polyamide can be expressed as "para-aramid".

Para-aramid is a heat-resistant resin obtained by condensation polymerization of a para-oriented aromatic diamine and a para-oriented aromatic dicarboxylic acid halide. Repeating units that constitute a substantial portion of the para-aramid each have amide bonds at para positions of an aromatic ring. Alternatively, the repeating units have amide bonds at quasi-para positions of an aromatic ring. Note that having amide bonds at the quasi-para positions of the aromatic ring indicates that two amide bonds extending from an aromatic ring are located in the same straight line or to be parallel to each other.

Specific examples of the para-aramid include poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloroparaphenylene terephthalamide), and a paraphenylene terephthalamide/2,6-dichloroparaphenylene terephthalamide copolymer.

Examples of the aromatic polyimide include a wholly aromatic polyimide produced by condensation polymerization of an aromatic tetracarboxylic dianhydride and an aromatic diamine. Examples of the aromatic tetracarboxylic dianhydride include pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane dianhydride, and 3,3',4,4'-biphenyl tetracarboxylic dianhydride. Examples of the aromatic diamine include oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine.

Examples of the aromatic polyamide imide include a resin obtained by condensation polymerization of an aromatic dicarboxylic acid and an aromatic diisocyanate and a resin obtained by condensation polymerization of an aromatic tricarboxylic acid anhydride and an aromatic diisocyanate. Examples of the aromatic dicarboxylic acid include isophthalic acid and terephthalic acid. Examples of the aromatic tricarboxylic acid anhydride include trimellitic anhydride. Examples of the aromatic diisocyanate include 4,4'-diphenylmethane diisocyanate, 2,4-tolylene diisocyanate, 2,6-tolylene diisocyanate, ortho tolylane diisocyanate, and m-xylene diisocyanate.

Among the heat-resistant resins exemplified above, the resin whose glass-transition temperature is not less than 200° C. is, for example, an aromatic polyamide, an aromatic polyimide, an aromatic polyamide imide, an aromatic polyester, or a polyether sulfone.

[1.3. Ionic Liquid, Mixture of Ionic Liquid and Lithium Salt, and Polymer Electrolyte]

The solid electrolyte-containing layer 30 contains at least one selected from an ionic liquid, a mixture of an ionic liquid and a lithium salt, and a polymer electrolyte. The solid electrolyte-containing layer 30 preferably contains an ionic liquid, or a mixture of an ionic liquid and a lithium salt, from the viewpoint of making higher the ion conductivity of the solid electrolyte-containing layer 30 to obtain a stable voltage output.

The solid electrolyte-containing layer 30 may contain more than one kind of at least one selected from an ionic liquid, a mixture of an ionic liquid and a lithium salt, and a polymer electrolyte. For example, the solid electrolyte-containing layer 30 may contain two or more kinds of ionic liquids, may contain two or more kinds of polymer electrolytes, or may contain an ionic liquid and a polymer electrolyte.

The ionic liquid refers to a substance containing cations and anions and having a melting point of not more than 100° C. (preferably a substance that is in a liquid state at room temperature (e.g., 25° C.)). The cations contained in the ionic liquid are typically an organic cation (or may be a complex ion in which an organic ligand is coordinated to an inorganic cation). Examples of the cations include an ammonium-based cation (imidazolium salts, pyridinium salts, etc.), a phosphonium ion-based cation, an alkali metal cation, and an alkaline-earth metal cation. Examples of the anions include a halogen-based anion (bromide ion, etc.), a boron-based anion (tetrafluoroborate, etc.), a phosphorus-based anion (hexafluorophosphate, etc.), a sulfonylimide-based anion (bis(trifluoromethylsulfonyl)imide (TFSI), bis(fluorosulfonyl)imide (FSI), etc.). Examples of the organic ligand coordinated to an inorganic cation (e.g., lithium ion) include triglyme and tetraglyme. The ionic liquid may be a mixture of a lithium salt and a non-ionic organic ligand. For example, the ionic liquid is a mixture of a lithium salt and tetraglyme. In this case, cations contained in the ionic liquid are lithium-containing complex ions, and anions contained in the ionic liquid are anions originally contained in the lithium salt.

Examples of the lithium salt of the mixture of an ionic liquid and the lithium salt include lithium hexafluorophosphate ($LiPF_6$), lithium tetrafluoroborate ($LiBF_4$), lithium perchlorate ($LiClO_4$), lithium bis(fluorosulfonyl)imide (LiFSI: $LiN(SO_2F)_2$), lithium bis(trifluoromethylsulfonyl)imide (LiTFSI: $LiN(SO_2CF_3)_2$), lithium bis(perfluoroethylsulfonyl)imide ($LiN(SO_2C_2F_5)_2$), $LiAsF_6$, $LiCF_3SO_3$, and lithium difluoro(oxalato)borate.

The polymer electrolyte is a mixture of a polymer compound having a polarity in the molecule thereof and a lithium salt. Examples of the polymer compound having a polarity in the molecule thereof include a compound having an alkylene oxide structure (ethylene oxide structure, propylene oxide structure, etc.), a polyethylenimine-based polymer, a polyalkylenesulfide-based polymer, and a polyvinylpyrrolidone-based polymer. These polymer compounds are capable of containing a large amount of lithium salts. This enables an increase in ion conductivity. Examples of the lithium salt contained in the polymer electrolyte include the compounds listed as examples of the lithium salt of the mixture of an ionic liquid and the lithium salt.

[2. Aspect of Solid Electrolyte-Containing Layer and Method for Producing Solid Electrolyte-Containing Layer]

The distribution of the heat-resistant resin 32 in the solid electrolyte-containing layer 30 is not limited to any particular form. For example, the heat-resistant resin 32 may be localized or may be uniformly distributed.

The distribution of the at least one selected from an ionic liquid, a mixture of an ionic liquid and a lithium salt, and a polymer electrolyte in the solid electrolyte-containing layer 30 is not limited to any particular form. However, the at least one selected from an ionic liquid, a mixture of an ionic liquid and a lithium salt, and a polymer electrolyte is preferably uniformly distributed in the solid electrolyte-containing layer 30 so that the ion conductivity of the solid electrolyte-containing layer 30 is increased.

The following methods (a), (b), (c), and (d) exemplify a method for producing the solid electrolyte-containing layer 30. The methods (a) and (c) are methods for producing the solid electrolyte-containing layer 30 that contains an ionic liquid, or a mixture of an ionic liquid and a lithium salt. The methods (b) and (d) are methods for producing the solid electrolyte-containing layer 30 that contains a polymer electrolyte.

(a) Powder of the inorganic solid electrolyte 31 and powder of the heat-resistant resin 32 are mixed together. A mixture thereby obtained is subjected to pressure-bonding, so that the mixture formed into a lump is obtained. A mixture thereby obtained is impregnated with one or more liquids selected from the group consisting of an ionic liquid and a mixture of an ionic liquid and a lithium salt. The solid electrolyte-containing layer 30 is thus obtained.

(b) Powder of the inorganic solid electrolyte 31, powder of the heat-resistant resin 32, and a polymer electrolyte are mixed together. A mixture thereby obtained is molded under pressure. The solid electrolyte-containing layer 30 is thus obtained.

(c) A slurry containing the inorganic solid electrolyte 31 and a solvent is applied on a porous base material (porous film, nonwoven fabric, etc.) containing the heat-resistant resin 32. Subsequently, the solvent is removed by drying or the like. A composite thereby obtained is impregnated with one or more liquids selected from the group consisting of: an ionic liquid; and a mixture of an ionic liquid and a lithium salt. The solid electrolyte-containing layer 30 is thus obtained.

(d) A slurry containing the inorganic solid electrolyte 31, a polymer electrolyte, and a solvent is applied on a porous base material (porous film, nonwoven fabric, etc.) containing the heat-resistant resin 32. Subsequently, the solvent is removed by drying or the like. The solid electrolyte-containing layer 30 is thus obtained.

The methods for producing the solid electrolyte-containing layer 30 described exemplified in (a) and (b) above are based on pressure molding. Such methods are preferable to methods based on sintering, in terms of enabling production by using simple equipment. The solid electrolyte-containing layer 30 may, as a matter of course, be produced by sintering.

The solid electrolyte-containing layer 30 may contain both (i) a polymer electrolyte and (ii) at least one selected from the group consisting of: an ionic liquid; and a mixture of an ionic liquid and a lithium salt. The solid electrolyte-containing layer 30 of this kind is obtained by, for example, impregnating a layer obtained in the production method (b) or (d) with one or more liquids selected from the group consisting of: an ionic liquid; and a mixture of an ionic liquid and a lithium salt.

For the production methods (a) and (c), when a mixture of an ionic liquid and a lithium salt is used, the composite described above may be impregnated with a mixture of an ionic liquid and a lithium salt that are mixed together in advance of the impregnation. Alternatively, the impregnation of the composite with an ionic liquid and the impregnation of the composite with a lithium salt may be carried out separately.

The term "porous base material" in the production methods (c) and (d) refers to a material that has a large number of pores and is therefore capable of transmitting a gas or a liquid from one face thereof to another face. The diameter of the pores of the porous base material is not limited to any particular value, but is preferably not more than 0.3 μm, and more preferably not more than 0.14 μm. The weight per unit area of the porous film is not limited to any particular value, but is preferably 4 $g/m^2$ to 20 $g/m^2$, more preferably 4 $g/m^2$ to 12 $g/m^2$, and even more preferably 5 $g/m^2$ to 12 $g/m^2$. The air permeability of the porous base material is preferably 30 sec/100 mL to 500 sec/100 mL and more preferably 50 sec/100 mL to 300 sec/100 mL in terms of Gurley values measured in conformity with JIS P8117.

Examples of the "porous base material containing the heat-resistant resin 32" in the production methods (c) and (d) include a porous base material consisting of the heat-resistant resin 32 and a porous base material including the heat-resistant resin 32 and another resin (a porous base material in which another resin and the heat-resistant resin form a laminated body. The porous base material including the heat-resistant resin 32 and another resin may further include a filler or the like. The material of the filler may be a conventionally, publicly known material (alumina, etc.).

Examples of such another resin include polyolefin. Specific examples of the polyolefin include a homopolymer and a copolymer obtained by polymerizing (or copolymerizing) a monomer(s) such as ethylene, propylene, 1-butene, 4-methyl-1-pentene, and/or 1-hexene. Examples of such a homopolymer include polyethylene, polypropylene, and polybutene. Examples of such a copolymer include an ethylene-propylene copolymer. Among these resins, polyethylene is preferable. Examples of the polyethylene include low-density polyethylene, high-density polyethylene, linear polyethylene (an ethylene-α-olefin copolymer), and ultra-high molecular weight polyethylene having a weight-average molecular weight of not less than 1,000,000. Among these kinds of polyethylene, ultra-high molecular weight polyethylene is particularly preferable.

(Short Circuit Prevention Film)

In an embodiment, the solid electrolyte-containing layer 30 can be a short circuit prevention film. As used herein, the "short circuit prevention film" refers to the solid electrolyte-containing layer 30 that has a function to prevent a short circuit. Whether the solid electrolyte-containing layer 30 has a function to prevent a short circuit (i.e., whether the solid electrolyte-containing layer 30 is a short circuit prevention film) can be determined by the following procedure.

1. A coin-type lithium battery CR2032 is used as a cell to be evaluated (which can be hereinafter referred to as a coin cell) and is subjected to a dendrite resistance test 1 or a dendrite resistance test 2. Note that an all-solid-state secondary battery that does not include a solid electrolyte 20, like a first embodiment (the all-solid-state secondary battery 100a illustrated in FIG. 2) which will be described later, is subjected to the dendrite resistance test 1.
2. At the point in time when one hour elapses after the test starts, a coin cell whose voltage did not become 0 V is taken apart, and the solid electrolyte-containing layer (in a case of the dendrite resistance test 1) is taken out. Alternatively, the solid electrolyte layer (in a case of the dendrite resistance test 2) is taken out.
3. The surface of the solid electrolyte-containing layer (or the solid electrolyte layer) having been taken out is observed. A solid electrolyte-containing layer (or a solid electrolyte layer) having less than 10 black points (i.e., dendrite evidences) present on the surface thereof is judged to be the short circuit prevention film in the present invention.

(Dendrite Resistance Test 1: Resistance Test with No Use of Solid Electrolyte Layer 20)

A laminated body under test which is as follows is prepared with use of a coin cell. While an electric current is passed through this laminated body at a density of 0.10 $mA/cm^2$ so that metal Li is continuously deposited on the negative electrode side, a change in voltage over time is observed. The test is conducted at 60° C.

The layer configuration of the laminated body under test is as follows:
  Stainless steel plate, thickness: 500 μm, diameter: 15.5 mm
  Metallic lithium foil on a dissolution side (positive electrode), thickness: 500 μm, diameter: 13 mm
  Solid electrolyte-containing layer 30 (short circuit prevention film), diameter: 15 mm
  Metallic lithium foil on a deposition side (negative electrode), thickness: 500 μm, diameter: 13 mm (Dendrite Resistance Test 2: Resistance Test with Use of Solid Electrolyte Layer 20)

A laminated body under test which is as follows is prepared with use of a coin cell. The other test conditions are the same as those in the dendrite resistance test 1.

The layer configuration of the laminated body under test is as follows.
  Stainless steel plate, thickness: 500 μm, diameter: 15.5 mm
  Metallic lithium foil on a dissolution side (positive electrode), thickness: 500 μm, diameter: 13 mm
  Solid electrolyte layer (e.g., a sintered body of $Li_{6.75}La_3Zr_{1.75}Nb_{0.25}O_{12}$, the sintered body having a thickness of 500 μm and a diameter of 15 mm, available from TOSHIMA Manufacturing Co., Ltd.)
  Solid electrolyte-containing layer 30 (short circuit prevention film), diameter: 15 mm
  Metallic lithium foil on a deposition side (negative electrode), thickness: 500 μm, diameter: 13 mm In the dendrite resistance tests 1 and 2, when no short circuit occurs and metal lithium is stably deposited on the negative electrode, the voltage of the coin cell never becomes 0 V. Meanwhile, when the coin cell is completely short-circuited due to a dendrite, the voltage of the coin cell becomes 0 V. Further, when a micro short circuit (micro short) is repeated due to dendrites, the voltage of the coin cell heavily varies between 0 V and a negative value.

The number of dendrite evidences present on the surface of the solid electrolyte-containing layer or the solid electrolyte layer being less than 10 after the dendrite resistance tests 1 or 2 indicates that the solid electrolyte-containing layer 30 (short circuit prevention film) inhibits the growth of a dendrite and prevents the entry of the dendrite into the positive electrode or the solid electrolyte layer.

The short circuit prevention film is preferably the solid electrolyte-containing layer 30 capable of being treated as a sheet-shaped object by itself in the production stage of the all-solid-state secondary batteries 100a, 100b, and 100c. Such a short circuit prevention film is capable of being distributed so as to serve as a member of the all-solid-state secondary batteries 100a, 100b, and 100c or serve as a product or a half-finished product by itself.

An aspect in which the solid electrolyte-containing layer 30 is a sheet-shaped short circuit prevention film has the following advantages to name a few.

(1) Material handleability is good. This facilitates the production of the all-solid-state secondary batteries 100a, 100b, and 100c.

(2) It is possible to produce a short circuit prevention film excellent in thickness uniformity and free of defects such as pinholes and use the same in a laminated body. In this case, it is therefore possible to obtain more excellent short circuit prevention properties than in a case of using another method (e.g. a method of applying and drying a solution, such as a method (γ) which will be described later).

(3) Unlike a method of applying/drying a solution, such as the method (γ) which will be described later, no solvent is used. This eliminates the possibility of the deterioration of the solid electrolyte caused by the solvent. Further, a step of removing the solvent is eliminated. This also eliminates the possibility of the deterioration of the solid electrolyte caused by heating, etc. carried out for removal of the solvent.

The inorganic solid electrolyte is contained in the solid electrolyte-containing layer 30 in a weight proportion whose lower limit is preferably not less than 25 weight % and more preferably not less than 40 weight %. The upper limit of the weight proportion of the inorganic solid electrolyte is preferably not more than 94 weight % and more preferably not more than 85 weight %. The heat-resistant resin is contained in the solid electrolyte-containing layer 30 in a weight proportion whose lower limit is preferably not less than 1 weight % and more preferably not less than 5 weight %. The upper limit of the weight proportion of the heat-resistant resin is preferably not more than 70 weight % and more preferably not more than 50 weight %. The ionic liquid, the mixture of an ionic liquid and a lithium salt, and the polymer electrolyte are contained in the solid electrolyte-containing layer 30 in a total weight proportion whose lower limit is preferably not less than 5 weight % and more preferably not less than 10 weight %. The upper limit of the total weight proportion of the ionic liquid, the mixture of an ionic liquid and a lithium salt, and the polymer electrolyte is preferably not more than 74 weight % and more preferably not more than 55 weight %, where the sum of (i) the amount of the ionic liquid, the mixture of an ionic liquid and a lithium salt, and the polymer electrolyte, (ii) the amount of the inorganic solid electrolyte, and (iii) the amount of the solid electrolyte-containing layer is regarded as 100 weight %. The solid electrolyte-containing layer 30 containing the respective components in such proportions enables a reduction in dendrites and prevention of a short circuit between the electrodes caused by the formation of a dendrite.

These lower limits and upper limits can be combined as appropriate. As a result of the combination, examples of the range of the weight proportion of the inorganic solid electrolyte include: not less than 25 weight % and not more than 94 weight %; and not less than 40 weight % and not more than 85 weight %. As a result of the combination, examples of the range of the weight proportion of the heat-resistant resin include: not less than 1 weight % and not more than 70 weight %; and not less than 5 weight % and not more than 50 weight %. As a result of the combination, examples of the range of the total weight proportion of the ionic liquid, the mixture of an ionic liquid and a lithium salt, and the polymer electrolyte include: not less than 5 weight % and not more than 74 weight %; and not less than 10 weight % and not more than 55 weight %.

The solid electrolyte-containing layer 30 has a thickness whose lower limit is preferably not less than 5 μm and more preferably not less than 10 μm. The upper limit of the thickness is preferably not more than 1000 μm and more preferably not more than 500 μm. The upper limits and the lower limits of the thickness of the solid electrolyte-containing layer 30 may be combined. As a result of the combination, examples of the range of the thickness include: not less than 5 μm and not more than 1000 μm; not less than 10 μm and not more than 500 μm; and not less than 10 μm and not more than 1000 μm. The solid electrolyte-containing layer 30 has an ion conductivity (e.g., the ion conductivity of a lithium ion) whose lower limit is preferably not less than $1 \times 10^{-6}$ S/cm and more preferably not less than $1 \times 10^{-5}$ S/cm at 60° C. The upper limit of the ion conductivity of the solid electrolyte-containing layer 30 is, for example, not more than $1\times10^{-2}$ S/cm. The upper limits and the lower limits of the ion conductivity of the solid electrolyte-containing layer 30 may be combined. As a result of the combination, examples of the range of the ion conductivity include: not less than $1\times10^{-6}$ S/cm and not more than $1\times10^{-2}$ S/cm; and not less than $1\times10^{-5}$ S/cm and not more than $1\times10^{-2}$ S/cm.

Examples of a method for measuring the ion conductivity of the solid electrolyte-containing layer 30 include a method in which an impedance method is used. Specifically, the measurement is carried out as follows.

1. A coin-type lithium battery CR2032 (which can be hereinafter referred to as a coin cell) is prepared by sandwiching a measurement sample between two sheets of blocking electrodes (e.g., electrodes made of SUS) in a dry argon atmosphere in a glove box.
2. The obtained coin cell is conditioned in a thermostatic chamber at 60° C. for 12 hours.
3. Measurement is carried out by using an impedance measuring device at a desired temperature, for frequencies ranging from 0.1 Hz to 1 MHz and an amplitude of 10 mV. An ion electrical conductivity σ is calculated from the following formula:

$$\sigma(S\cdot cm^{-1}) = t\ (cm) \times R\ (\Omega)/A\ (cm^2)$$

In this formula, R represents the value of an impedance. A represents the area of a sample, and t represents the thickness of the sample.

[3. All-Solid-State Secondary Battery and Laminated Body for All-Solid-State Secondary Battery]

The all-solid-state secondary battery in accordance with an aspect of the present invention includes the solid electrolyte-containing layer 30. Examples of this all-solid-state secondary battery include three embodiments below. A first embodiment does not include the solid electrolyte layer 20 but includes one solid electrolyte-containing layer 30 (all-solid-state secondary battery 100a illustrated in FIG. 2). A second embodiment includes one solid electrolyte layer 20 and one solid electrolyte-containing layer 30 (all-solid-state secondary battery 100b illustrated in FIG. 3). A third embodiment includes one solid electrolyte layer 20 and two solid electrolyte-containing layers 30 (all-solid-state secondary battery 100c illustrated in FIG. 4). These embodiments will be described below.

First Embodiment

Figure 2:
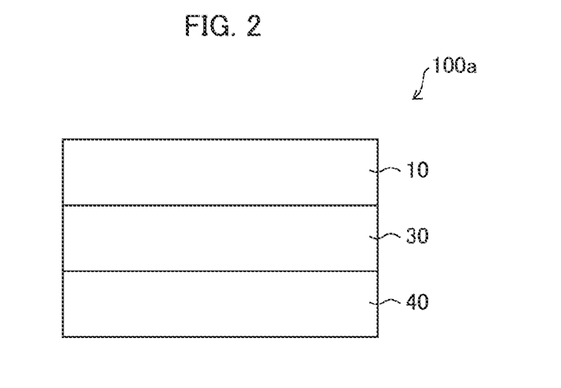
FIG. 2 is a schematic diagram of a configuration of an all-solid-state secondary battery in accordance with an embodiment of the present invention, the schematic diagram illustrating an all-solid-state secondary battery of a first embodiment.

Reference is made to FIG. 2. The all-solid-state secondary battery 100a in accordance with the first embodiment includes: a positive electrode 10; a solid electrolyte-containing layer 30; and a negative electrode 40.

Second Embodiment

Figure 3:
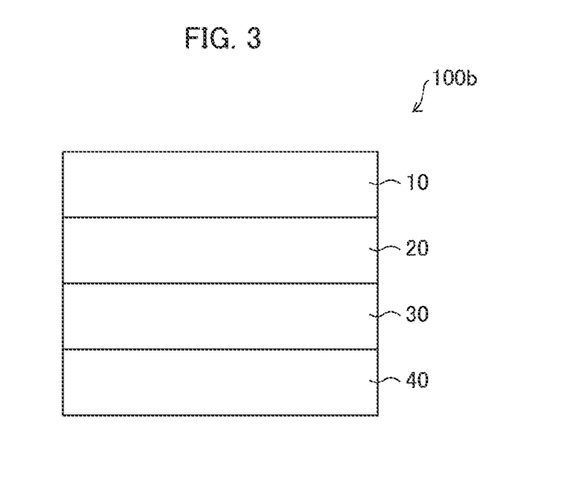
FIG. 3 is a schematic diagram of a configuration of an all-solid-state secondary battery in accordance with another embodiment of the present invention, the schematic diagram illustrating an all-solid-state secondary battery of a second embodiment.

Reference is made to FIG. 3. The all-solid-state secondary battery 100b in accordance with the second embodiment includes: a positive electrode 10; a solid electrolyte layer 20; a solid electrolyte-containing layer 30; and a negative electrode 40. The solid electrolyte-containing layer 30 is adjacent to the solid electrolyte layer 20 and the negative electrode 40.

Third Embodiment

Figure 4:
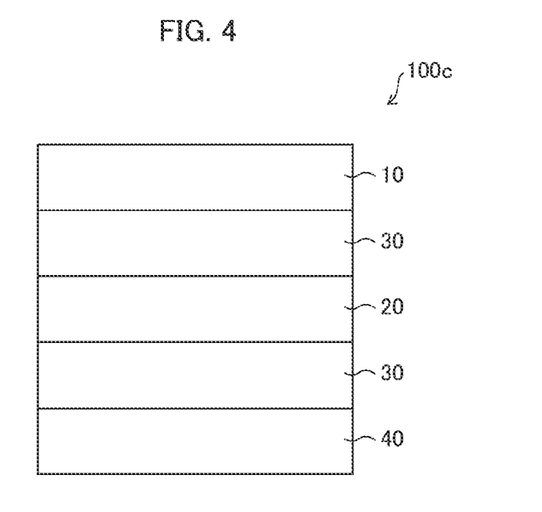
FIG. 4 is a schematic diagram of a configuration of an all-solid-state secondary battery in accordance with still another embodiment of the present invention, the schematic diagram illustrating an all-solid-state secondary battery of a third embodiment.

Reference is made to FIG. 4. The all-solid-state secondary battery 100c in accordance with the third embodiment includes: a positive electrode 10; a solid electrolyte-containing layer 30; a solid electrolyte layer 20; a solid electrolyte-containing layer 30; and a negative electrode 40. One of the solid electrolyte-containing layers 30 is adjacent to the solid electrolyte layer 20 and the negative electrode 40. The other one of the solid electrolyte-containing layers 30 is adjacent to the positive electrode 10 and the solid electrolyte layer 20.

From the viewpoint of making the all-solid-state secondary batteries compact, the first embodiment is most preferable and the second embodiment is the second most preferable. Whereas, from the viewpoint of enhancing the mechanical strength of the laminated body with respect to bending and breaking and from the viewpoint of keeping the positive and negative electrodes away from each other to enhance safety, the second embodiment and the third embodiment are preferable.

As used herein, the term "all-solid-state secondary battery" refers to a secondary battery in which a solid electrolyte is used as an electrolyte, i.e., a secondary battery including a solid electrolyte. In an embodiment, the all-solid-state secondary batteries 100a, 100b, and 100c do not include an electrolytic solution (e.g., aqueous electrolyte or nonaqueous electrolyte).

The all-solid-state secondary batteries 100a, 100b, and 100c are not limited to any particular form. Examples of the form include a coin-type cell, a laminate-type cell, a cylindrical cell, and a prismatic cell. Although being capable of being charged and discharged repeatedly, the all-solid-state secondary batteries can serve as a primary battery. Specifically, the all-solid-state secondary battery having been charged may be used for one-time-only discharge.

The all-solid-state secondary batteries 100a, 100b, and 100c are, for example, an all-solid-state lithium secondary battery, an all-solid-state sodium secondary battery, and are preferably an all-solid-state lithium secondary battery.

The all-solid-state secondary batteries 100a, 100b, and 100c are not limited to any particular use. For example, the all-solid-state secondary batteries 100a, 100b, and 100c are used for moving bodies (electric automobiles, electric motorcycles, power-assisted bicycles, trains, etc.), industrial machines (construction machines, forklifts, elevators, etc.), stationary power supplies (solar power generation, wind power generation, UPS, medical devices, etc.), or consumer goods (mobile PC, smartphone, etc.).

Members included in the all-solid-state secondary batteries 100a, 100b, and 100c except the solid electrolyte-containing layer 30 will be individually described below.

[3.1. Positive Electrode]

The positive electrode 10 includes, for example, a positive electrode active material layer and a positive electrode current collector.

The positive electrode active material layer contains at least a positive electrode active material. Examples of the positive electrode active material include an oxide-based active material and a sulfur-based active material.

Examples of the oxide-based active material include: a layered rock-salt active material ($LiCoO_2$, $LiMnO_2$, $LiVO_2$, $LiNi_{1/3}Co_{1/3}Mn_{1/3}O_2$, etc.); a spinel active material ($LiMn_2O_4$, $Li_4Ti_5O_{12}$, $Li(Ni_{0.5}Mn_{1.5})O_4$, etc.); and an olivine active material ($LiFePO_4$, $LiMnPO_4$, $LiNiPO_4$, $LiCoPO_4$, etc.). Examples of the oxide-based active material also include an LiMn spinel active material represented by $Li_{1+x}Mn_{2-x-y}M_yO_4$ (M is one or more selected from the group consisting of Al, Mg, Co, Fe, Ni, and Zn, and $0<x+y<2$); and lithium titanate.

A coating layer containing a Li ion-conducting oxide may be provided on the surface of the oxide-based active material. Providing the coating layer enables inhibition of a reaction between the oxide-based active material and the solid electrolyte. Examples of the Li ion-conducting oxide include $LiNbO_3$, $Li_4Ti_5O_{12}$, and $Li_3PO_4$. The coating layer has a thickness whose lower limit can be, for example, not less than 0.1 nm or not less than 1 nm. The upper limit of the thickness of the coating layer can be, for example, not more than 100 nm or not more than 20 nm. The ratio of coverage, by the coating layer, of the surface of the oxide-based active material is, for example, not less than 70%, or not less than 90%.

The sulfur-based active material contains at least the sulfur element. The sulfur-based active material optionally contains the Li element. Examples of the sulfur-based active material include elemental sulfur, lithium sulfide ($Li_2S$), and lithium polysulfide ($Li_2S_x$; $2 \leq x \leq 8$).

The positive electrode active material layer may contain, as needed, one or more selected from the group consisting of an inorganic solid electrolyte, an electrically conductive material, and a binder. The inorganic solid electrolyte can be, for example, the inorganic solid electrolyte described in the section [1.1.]. Examples of the electrically conductive material include acetylene black, Ketjenblack, and a carbon fiber. Examples of the binder include: a rubber binder (butylene rubber (BR), styrene butadiene rubber (SBR), etc.); and a fluoride binder (polyvinylidene fluoride (PVDF), etc.).

The positive electrode active material layer has a thickness whose lower limit is, for example, not less than 0.1 µm. The upper limit of the thickness of the positive electrode active material layer is, for example, not more than 300 µm or not more than 100 µm.

Examples of a material of the positive electrode current collector include stainless steel, aluminum, nickel, iron, titanium, and carbon. Examples of the form of the positive electrode current collector include a foil form and a plate form. The positive electrode current collector has a thickness whose lower limit is, for example, not less than 0.1 µm or not less than 1 µm. The upper limit of the thickness of the positive electrode current collector is, for example, not more than 1 mm or not more than 100 µm.

[3.2. Negative Electrode]

The negative electrode 40 includes, for example, a negative electrode active material layer and a negative electrode current collector.

The negative electrode active material layer contains at least a negative electrode active material. Examples of the negative electrode active material include a lithium metal, a lithium alloy, a metal capable of being alloyed with lithium, a carbon-based material, and an oxide-based material.

Examples of the carbon-based material include graphite, amorphous carbon, a carbon nanotube, and graphene. Examples of the oxide-based material include $Li_4Ti_5O_{12}$ (LTO) and $TiO_2$.

The negative electrode active material layer may contain, as needed, one or more selected from the group consisting of an inorganic solid electrolyte, an electrically conductive material, and a binder. These materials are, for example, the inorganic solid electrolyte, the electrically conductive material, and the binder that can be contained in the positive electrode active material layer and that are exemplified in the section [3.1.].

The negative electrode active material layer has a thickness whose lower limit is, for example, not less than 0.1 µm. The upper limit of the thickness of the negative electrode active material layer is, for example, not more than 300 µm or not more than 100 µm.

Examples of a material of the negative electrode current collector include a material that is not capable of being alloyed with Li. More specific examples of such a material include stainless steel, copper, nickel, and carbon. Examples of the form of the negative electrode current collector include a foil form and a plate form. The negative electrode current collector has a thickness whose lower limit is, for example, not less than 0.1 µm or not less than 1 µm. The upper limit of the thickness of the negative electrode current collector is, for example, not more than 1 mm or not more than 100 µm.

[3.3. Solid Electrolyte Layer]

The solid electrolyte layer 20 contains at least a solid electrolyte. The solid electrolyte layer 20 differs from the solid electrolyte-containing layer 30. For example, the weight proportion of the heat-resistant resin in the solid electrolyte layer 20 is less than 1 weight %, where the total weight of the solid electrolyte layer 20 is regarded as 100 weight %. The solid electrolyte contained in the solid electrolyte layer 20 may be an inorganic solid electrolyte or may be an organic solid electrolyte. Examples of the inorganic solid electrolyte include a sulfide-based solid electrolyte, an oxide-based solid electrolyte, and a nitride-based solid electrolyte. Examples of the organic solid electrolyte include a polymer electrolyte and a gel electrolyte.

Among these solid electrolytes, a dendrite is likely to form along the grain boundaries of electrolyte particles of the sulfide-based solid electrolyte and the oxide-based solid electrolyte. Providing the solid electrolyte-containing layers 30 makes it possible, even when a sulfide-based solid electrolyte or an oxide-based solid electrolyte is used as the solid electrolyte layer 20, to reduce dendrites and therefore prevent a short circuit between the electrodes caused by the formation of a dendrite. Further, a sulfide-based solid electrolyte has a risk of generating a poisonous gas, such as hydrogen sulfide, when being exposed to the atmosphere, whereas an oxide-based solid electrolyte does not have such a risk. It is therefore preferable to use an oxide-based solid electrolyte as the inorganic solid electrolyte to be contained in the solid electrolyte layer 20, from the viewpoint of the safety of the all-solid-state secondary battery.

(Inorganic Solid Electrolyte)

As an explanation of the inorganic solid electrolyte and specific examples of the inorganic solid electrolyte, the description in the section [1.1.] is employed. As the inorganic solid electrolyte used in the solid electrolyte layer 20, an electrolyte in a pellet form can be used. The pellet form refers to a form into which powder is molded by, for example, compression, sintering, or both. The inorganic solid electrolyte in a pellet form has a thickness preferably of not more than 1 mm, and more preferably of not more than 500 µm.

(Organic Solid Electrolyte)

As an explanation of the polymer electrolyte and specific examples of the polymer electrolyte, the description in the section [1.3.] is employed.

The gel electrolyte is, for example, a mixture of a polymer compound having a gelation effect and a nonaqueous electrolyte. The gel electrolyte, which is a polymer compound holding a nonaqueous electrolyte, has moderate plasticity and adhesion and has an ion conductivity close to that of the nonaqueous electrolyte. An all-solid-state secondary battery in which the gel electrolyte is used can therefore provide high charge-discharge efficiency. A mixing ratio of the polymer compound to the nonaqueous electrolyte can be (2:3) to (3:2) from the viewpoint of obtaining a moderate plasticity.

Examples of the polymer compound having a gelation effect include a fluorine resin containing a vinylidene fluoride unit, an acrylic resin containing a (meta)acrylic acid unit (the (meta)acrylic acid unit may have been esterified), and a polyether resin containing a polyalkylene oxide unit. Examples of the fluorine resin containing a vinylidene fluoride unit include polyvinylidene fluoride, a copolymer containing a vinylidene fluoride unit and a hexafluoropropylene unit, and a copolymer containing a vinylidene fluoride unit and a trifluoroethylene unit. In addition, the polymer compound (e.g., a compound having an alkylene oxide structure) used in the polymer electrolyte can be used.

The nonaqueous electrolyte contained in the gel electrolyte contains a lithium salt and a nonaqueous solvent in which the lithium salt is to be dissolved. Examples of the lithium salt include substances exemplified in the section [1.3.]. Examples of the nonaqueous solvent include cyclic carbonate esters, chain carbonate esters, carboxylic acid esters, cyclic ethers, chain ethers, nitriles, and amides.

[4. Method for Producing All-Solid-State Secondary Battery]

A method, in accordance with an aspect of the present invention, for producing the all-solid-state secondary batteries 100a, 100b, and 100c includes a step of disposing the solid electrolyte-containing layer 30 between the positive electrode 10 and the negative electrode 40. In an embodiment, the production method includes a step of disposing the solid electrolyte-containing layer 30 between the solid electrolyte layer 20 and the negative electrode 40 (a method for producing the all-solid-state secondary batteries 100b and 100c). In an embodiment, the production method further includes a step of disposing the solid electrolyte-containing layer 30 between the solid electrolyte layer 20 and the positive electrode 10 (a method for producing the all-solid-state secondary battery 100c).

The following description will discuss a method for producing a laminated body represented as the all-solid-state secondary battery 100a, 100b, or 100c, with a focus being placed on a method of disposing the solid electrolyte-containing layer 30.

(Method for Producing All-Solid-State Secondary Battery 100a)

Examples of the method of disposing, as in the all-solid-state secondary battery 100a, the solid electrolyte-containing layer 30 between the positive electrode 10 and the negative electrode 40 include methods described below. These methods provide a laminated body (all-solid-state secondary battery 100a) in which the positive electrode 10, the solid electrolyte-containing layer 30, and the negative electrode 40 are formed on top of each other in this order.

(α) A method of preparing the solid electrolyte-containing layer 30 and then disposing the solid electrolyte-containing layer 30 between the positive electrode 10 and the negative electrode 40. For example, a method of (i) placing a short circuit prevention film on the positive electrode 10 (or the negative electrode 40) and (ii) placing the negative electrode 40 (or the positive electrode 10) on the short circuit prevention film. Examples of the method for preparing the solid electrolyte-containing layer 30 include the methods (a) to (d) described in the section [2].

(β) A method of disposing a film containing the inorganic solid electrolyte 31 and the heat-resistant resin 32 between the positive electrode 10 and the negative electrode 40 and then preparing the solid electrolyte-containing layer 30. For example, a method of (i) placing the film containing the inorganic solid electrolyte 31 and the heat-resistant resin 32 on the positive electrode 10 (or the negative electrode 40), (ii) impregnating the film with, or causing the film to support, one or more selected from the group consisting of an ionic liquid, a mixture of an ionic liquid and a lithium salt, and a polymer electrolyte, and thereby forming the solid electrolyte-containing layer 30, and (iii) forming the negative electrode 40 (or the positive electrode 10) on the solid electrolyte-containing layer 30.

(γ) A method of preparing the solid electrolyte-containing layer 30 by applying, to the positive electrode 10 (or the negative electrode 40), a solution containing the inorganic solid electrolyte 31, the heat-resistant resin 32, and at least one selected from the group consisting of an ionic liquid, a mixture of an ionic liquid and a lithium salt, and a polymer electrolyte. For example, a method of (i) preparing a solution containing the inorganic solid electrolyte 31, the heat-resistant resin 32, one or more selected from the group consisting of: an ionic liquid; a mixture of an ionic liquid and a lithium salt; and a polymer electrolyte, and a solvent, (ii) applying the solution on the positive electrode 10 (or the negative electrode 40), (iii) forming the solid electrolyte-containing layers 30 by removing the solvent by drying, and (iv) forming the negative electrode 40 (or the positive electrode 10) on the solid electrolyte-containing layers 30.

(δ) A method of preparing the solid electrolyte-containing layer 30 by disposing, on the positive electrode 10 (or the negative electrode 40), powder of a mixture containing the inorganic solid electrolyte 31, the heat-resistant resin 32, and at least one selected from the group consisting of an ionic liquid, a mixture of an ionic liquid and a lithium salt, and a polymer electrolyte and then carrying out molding. For example, a method of (i) preparing powder of a mixture containing the inorganic solid electrolyte 31, the heat-resistant resin 32, at least one selected from an ionic liquid, a mixture of an ionic liquid and a lithium salt, and a polymer electrolyte, (ii) disposing the powder between the positive electrode 10 and the negative electrode 40, and (iii) carrying out press-molding.

(Method for Producing All-Solid-State Secondary Battery 100b)

Replacing the term "positive electrode 10" with the term "solid electrolyte layer 20" in the methods (α) to (δ) provides methods of disposing the solid electrolyte-containing layer 30 between the solid electrolyte layer 20 and the negative electrode 40. By these methods, a laminated body in which the solid electrolyte layer 20, the solid electrolyte-containing layer 30, and the negative electrode 40 are formed on top of each other in this order is obtained. When the positive electrode 10 is additionally formed on the solid electrolyte layer 20 of this laminated body, a laminated body (all-solid-state secondary battery 100b) in which the positive electrode 10, the solid electrolyte layer 20, the solid electrolyte-containing layer 30, and the negative electrode 40 are formed on top of each other in this order can be produced.

(Method for Producing All-Solid-State Secondary Battery 100c)

After the laminated body in which the solid electrolyte layer 20, the solid electrolyte-containing layer 30, and the negative electrode 40 are formed on top of each other in this order is obtained by using the above-described methods, when the solid electrolyte-containing layer 30 and the positive electrode 10 are additionally formed on the solid electrolyte layer 20 of the laminated body, a laminated body (all-solid-state secondary battery 100c) in which the positive electrode 10, the solid electrolyte-containing layer 30, the solid electrolyte layer 20, the solid electrolyte-containing layer 30, and the negative electrode 40 are formed on top of each other in this order can be produced.

Alternatively, replacing the term "negative electrode 40" with the term "solid electrolyte layer 20" in the methods ($\alpha$) to ($\delta$) provides methods of disposing the solid electrolyte-containing layer 30 between the positive electrode 10 and the solid electrolyte layer 20. By these methods, a laminated body in which the positive electrode 10, the solid electrolyte-containing layer 30, and the solid electrolyte layer 20 are formed on top of each other in this order is obtained. When the solid electrolyte-containing layer 30 and the negative electrode 40 are additionally formed on the solid electrolyte layer 20 of this laminated body, a laminated body (all-solid-state secondary battery 100c) in which the positive electrode 10, the solid electrolyte-containing layer 30, the solid electrolyte layer 20, the solid electrolyte-containing layer 30, and the negative electrode 40 are formed on top of each other in this order can be produced.

In the above production methods, the positive electrode 10, the solid electrolyte layer 20, and the negative electrode 40 may each be a precursor. Specifically, the positive electrode 10, the solid electrolyte layer 20, and the negative electrode 40 may be formed by subjecting precursors thereof to heating, pressure-bonding, etc. after carrying out the above methods ($\alpha$) to ($\delta$). The precursor is a compound or a mixture that becomes the positive electrode 10, the solid electrolyte layer 20, or the negative electrode 40 after undergoing heating, pressure-bonding, etc.

In the above production methods, the positive electrode 10, the solid electrolyte layer 20, and the negative electrode 40 may be produced by a publicly known method. For example, these layers can be produced by a wet method that includes drying a raw material slurry or by a powder molding method of pressing raw material powder. When the solid electrolyte layer 20 is an organic solid electrolyte layer, the solid electrolyte layer 20 can be produced by a polymerization method or the like which is publicly known.

The all-solid-state secondary batteries 100a, 100b, and 100c may include a component such as a housing for holding the laminated body and a lead for drawing an electric current from an electrode, although the component is not illustrated in the drawings. As a method for producing and assembling these members to build a battery product, a conventionally, publicly known method can be used.

The matters described in each of the above items can be employed as appropriate in another item. The present invention is not limited to the above-described embodiments, but may be altered in various ways by a skilled person within the scope of the claims. The present invention also encompasses, in its technical scope, any embodiment derived by combining technical means disclosed in differing embodiments.

All of the patent literatures described herein are employed herein as references.

The present invention will be described in more detail below by discussing Examples. However, the present invention is not limited only to the Examples below.

EXAMPLES

An experiment was conducted to verify a dendrite reduction effect brought about by use of a solid electrolyte-containing layer. In this experiment, a coin-type lithium battery CR2032 was used as a cell to be evaluated. Specifically, a laminated body under test including the layers (stainless steel plate/metallic lithium foil on a dissolution side/solid electrolyte-containing layer/metallic lithium foil on a deposition side) was prepared. An electric current was passed through this laminated body at a density of 0.10 mA/cm$^2$, and the behavior of a voltage over time was observed. Note that this electric current density is a limiting current density obtained when a deposition-dissolution cycle test is carried out with use of a pellet of an LLZN sintered body ($Li_{6.75}La_3Zr_{1.75}Nb_{0.25}O_{12}$, pellet thickness: 500 μm) commercially available from TOSHIMA Manufacturing Co., Ltd. The test was conducted at 60° C. The test was conducted for one hour. The details of each layer are as follows:

Stainless steel plate, thickness: 500 μm, diameter: 15.5 mm

Metallic lithium foil on a dissolution side, thickness: 500 μm, diameter: 13 mm

Solid electrolyte-containing layer, diameter: 15 mm

Metallic lithium foil on a deposition side, thickness: 500 μm, diameter: 13 mm.

The ion conductivity of the solid electrolyte-containing layer was measured by using an impedance method. Specifically, the measurement was carried out as follows:

1. A coin-type lithium battery CR2032 (a coin cell) was prepared by sandwiching a measurement sample between two blocking electrodes (e.g., electrodes made of SUS) in a dry argon atmosphere in a glove box.
2. The obtained coin cell was conditioned in a thermostatic chamber at 60° C. for 12 hours.
3. Measurement was carried out by using an impedance measuring device at 60° C., for frequencies ranging from 0.1 Hz to 1 MHz and an amplitude of 10 mV. An ion electrical conductivity σ was calculated from the following formula:

$$\sigma(S \cdot cm^{-1}) = t\ (cm) \times R\ (\Omega)/A\ (cm^2)$$

In this formula, R represents the value of an impedance. A represents the area of a sample, and t represents the thickness of the sample.

Example 1

An inorganic solid electrolyte (powder of $Li_6La_3Ta_{1.5}Y_{0.5}O_{12}$; LLTY available from TOSHIMA Manufacturing Co., Ltd., $D_{50}$=2 μm to 3 μm) of 1500 mg and a heat-resistant resin (poly(paraphenylene terephthalamide)) of 500 mg were mixed for 15 minutes by using a mortar and a pestle. Next, 111 mg of a mixture thereby obtained was molded into a pellet under a pressure of 200 MPa for about two minutes. This pellet was impregnated with 50 μL electrolyte (70 mg) of an ionic liquid, so that a solid electrolyte-containing layer 1 was obtained. As the ionic liquid, [Li(G4)][FSI], which is a mixture of tetraglyme (G4) and lithium bis(fluorosulfonyl)imide (LiFSI), was used. The solid electrolyte-containing layer 1 had a thickness of 293 μm. The solid electrolyte-containing layer 1 obtained had an ion conductivity at 60° C. of 4.2×10$^{-4}$ S/cm.

Example 2

An inorganic solid electrolyte (powder of $Li_6La_3Ta_{1.5}Y_{0.5}O_{12}$; LLTY available from TOSHIMA Manufacturing Co., Ltd., $D_{50}$=2 μm to 3 μm) of 1200 mg, a heat-resistant resin (poly(paraphenylene terephthalamide)) of 400 mg, and a polymer electrolyte of 400 mg were mixed for 15 minutes by using a mortar and a pestle. As the polymer electrolyte, polyethylene oxide (PEO) to which lithium bis(trifluoromethylsulfonyl)imide (LiTFSI) was added was used. A mixing ratio was adjusted such that Li/ethylene oxide repeating unit=1/24 (mole ratio). Next, 153 mg of a mixture thereby obtained was molded into a pellet under a pressure of 200 MPa for about two minutes. This pellet was used as a solid electrolyte-containing layer 2. The solid electrolyte-containing layer 2 had a thickness of 521 µm. The solid electrolyte-containing layer 2 obtained had an ion conductivity at 60° C. of $3.3 \times 10^{-6}$ S/cm.

Example 3

An inorganic solid electrolyte (powder of $Li_6La_3Ta_{1.5}Y_{0.5}O_{12}$; LLTY available from TOSHIMA Manufacturing Co., Ltd., $D_{50}$=2 µm to 3 µm) of 1200 mg, a heat-resistant resin (poly(paraphenylene terephthalamide)) of 400 mg, and a polymer electrolyte of 400 mg were mixed for 15 minutes by using a mortar and a pestle. As the polymer electrolyte, the same polymer electrolyte that was used in Example 2 was used. Next, 216 mg of a mixture thereby obtained was molded into a pellet under a pressure of 200 MPa for about two minutes. This pellet was impregnated with 50 µL (70 mg) of the same ionic liquid that was used in Example 1, so that a solid electrolyte-containing layer 3 was obtained. The solid electrolyte-containing layer 3 had a thickness of 655 µm.

Example 4

An inorganic solid electrolyte (powder of $Li_6La_3Ta_{1.5}Y_{0.5}O_{12}$; LLTY available from TOSHIMA Manufacturing Co., Ltd., $D_{50}$=2 µm to 3 µm) of 1500 mg and a heat-resistant resin (aromatic polyamide imide whose glass-transition temperature is approximately 260° C.) of 500 mg were mixed for 15 minutes by using a mortar and a pestle. Next, 110 mg of a mixture thereby obtained was molded into a pellet under a pressure of 200 MPa for about two minutes. This pellet was impregnated with 50 µL (70 mg) of an ionic liquid, so that a solid electrolyte-containing layer 4 was obtained. As the ionic liquid, [Li(G4)][FSI], which is a mixture of tetraglyme (G4) and lithium bis (fluorosulfonyl)imide (LiFSI), was used. The solid electrolyte-containing layer 4 had a thickness of 315 µm.

Example 5

An inorganic solid electrolyte (powder of $Li_6La_3Ta_{1.5}Y_{0.5}O_{12}$; LLTY available from TOSHIMA Manufacturing Co., Ltd., $D_{50}$=2 µm to 3 µm) of 1500 mg and a heat-resistant resin (aromatic polyester whose glass-transition temperature is approximately 240° C.) of 500 mg were mixed for 15 minutes by using a mortar and a pestle. Next, 113 mg of a mixture thereby obtained was molded into a pellet under a pressure of 200 MPa for about two minutes. This pellet was impregnated with 50 µL (70 mg) of an ionic liquid, so that a solid electrolyte-containing layer 5 was obtained. As the ionic liquid, [Li(G4)][FSI], which is a mixture of tetraglyme (G4) and lithium bis(fluorosulfonyl) imide (LiFSI), was used. The solid electrolyte-containing layer 5 had a thickness of 302 µm.

Comparative Example 1

A sintered body of $Li_6La_3Ta_{1.5}Y_{0.5}O_{12}$ available from TOSHIMA Manufacturing Co., Ltd. in the form of a pellet was used as a solid electrolyte layer for comparison. The solid electrolyte layer for comparison had a thickness of 500 µm.

The solid electrolyte-containing layer 3, which contains a polymer electrolyte, falls under the "solid electrolyte-containing layer that contains a polymer electrolyte". Here, a polymer electrolyte is a substance containing a lithium ion salt. Therefore, the solid electrolyte-containing layer 3 also falls under a "solid electrolyte-containing layer that contains a mixture of an ionic liquid and a lithium salt".

Comparative Example 2

An inorganic solid electrolyte (powder of $Li_6La_3Ta_{1.5}Y_{0.5}O_{12}$; LLTY available from TOSHIMA Manufacturing Co., Ltd., $D_{50}$=2 µm to 3 µm) and a heat-resistant resin (poly(paraphenylene terephthalamide)) were mixed for 15 minutes by using a mortar and a pestle. The heat-resistant resin content was set to 25 weight %. Next, a mixture thereby obtained was molded into a pellet under a pressure of 200 MPa for about two minutes. Next, gold was vapor-deposited on both faces of a pellet thereby obtained. The impedance of a pellet thereby obtained was measured. This revealed that the Cole-Cole plot thereof took an irregular shape, and the pellet did not have ion conductivity. This pellet was not a pellet usable in all-solid-state secondary batteries. As a result, this pellet was unlikely to yield an effect of reducing dendrites in all-solid-state secondary batteries. Because this pellet only contained an inorganic solid electrolyte and a heat-resistant resin, an ion conduction path is considered to have been interrupted.

Results

From the beginning of the test until the end (for one hour), the voltages of the laminated bodies under test in accordance with Examples 1 to 5 did not become 0 V. It is considered from this that the solid electrolyte-containing layer prevents a short circuit between electrodes caused by the formation of a dendrite in the laminated bodies under test in accordance with Examples 1 to 5. Among the Examples, voltage output was stable throughout the test in Example 1, and Examples 3 to 5. Conversely, a drop in voltage over time was observed in Example 2.

In contrast, the voltage of the laminated body under test in accordance with Comparative Example 1 became nearly 0 multiple times. This is considered to be due to the occurrence of a micro short caused by a grown dendrite, which was caused by the absence of the solid electrolyte-containing layer.

These results have suggested that using the solid electrolyte-containing layer enables prevention of a short circuit between the electrodes caused by the formation of a dendrite. It has been also suggested that the solid electrolyte-containing layer containing an ionic liquid or a mixture of an ionic liquid and a lithium salt is preferable from the viewpoint of a stable voltage output.

INDUSTRIAL APPLICABILITY

The present invention is usable in all-solid-state secondary batteries and the like.

REFERENCE SIGNS LIST

10: Positive electrode
20: Solid electrolyte layer

30: Solid electrolyte-containing layer
31: Inorganic solid electrolyte
32: Heat-resistant resin
40: Negative electrode
100a: All-solid-state secondary battery
100b: All-solid-state secondary battery
100c: All-solid-state secondary battery

The invention claimed is:

1. An all-solid-state secondary battery comprising:
a positive electrode;
one or more solid electrolyte-containing layers; and
a negative electrode,
the one or more solid electrolyte-containing layers each including the following components (i) to (iii):
(i) an inorganic solid electrolyte;
(ii) a heat-resistant resin; and
(iii) at least one selected from the group consisting of an ionic liquid, a mixture of an ionic liquid and a lithium salt, and a polymer electrolyte, wherein
in each of the one or more solid electrolyte-containing layers, the components (i) to (iii) are uniformly distributed in a film thickness direction, and
when the one or more solid electrolyte-containing layers are a plurality of solid electrolyte-containing layers, two or more of the plurality of solid electrolyte-containing layers are not consecutively formed on top of each other.

2. The all-solid-state secondary battery according to claim 1, wherein the heat-resistant resin has a glass-transition temperature of not less than 200° C.

3. The all-solid-state secondary battery according to claim 1, wherein the inorganic solid electrolyte is a sulfide-based solid electrolyte or an oxide-based solid electrolyte.

4. A method for producing an all-solid-state secondary battery, the method comprising the step of disposing, between a positive electrode and a negative electrode, one or more solid electrolyte-containing layers,
the one or more solid electrolyte-containing layers each including the following components (i) to (iii):
(i) an inorganic solid electrolyte;
(ii) a heat-resistant resin; and
(iii) at least one selected from the group consisting of an ionic liquid, a mixture of an ionic liquid and a lithium salt, and a polymer electrolyte, wherein
in each of the one or more solid electrolyte-containing layers, the components (i) to (iii) are uniformly distributed in a film thickness direction, and
when the one or more solid electrolyte-containing layers are a plurality of solid electrolyte-containing layers, two or more of the plurality of solid electrolyte-containing layers are not consecutively formed on top of each other.

5. A method for preventing a short circuit in an all-solid-state secondary battery, the method comprising disposing, between a positive electrode and a negative electrode, one or more solid electrolyte-containing layers,
the one or more solid electrolyte-containing layers each including the following components (i) to (iii):
(i) an inorganic solid electrolyte;
(ii) a heat-resistant resin; and
(iii) at least one selected from the group consisting of an ionic liquid, a mixture of an ionic liquid and a lithium salt, and a polymer electrolyte, wherein
in each of the one or more solid electrolyte-containing layers, the components (i) to (iii) are uniformly distributed in a film thickness direction, and
when the one or more solid electrolyte-containing layers are a plurality of solid electrolyte-containing layers, two or more of the plurality of solid electrolyte-containing layers are not consecutively formed on top of each other.

* * * * *